US012626597B2

(12) United States Patent
Easley et al.

(10) Patent No.: US 12,626,597 B2
(45) Date of Patent: May 12, 2026

(54) VEHICLE CONTROL BASED ON GROUP AND LOCATION

(71) Applicant: Textron Inc., Providence, RI (US)

(72) Inventors: Preston Sering Easley, Martinez, GA (US); Brianna Danielle Harrington, Augusta, GA (US); Payton Michael Loppnow, Augusta, GA (US)

(73) Assignee: TEXTRON INC., Providence, RI (US)

( * ) Notice: Subject to any disclaimer, the term of this patent is extended or adjusted under 35 U.S.C. 154(b) by 127 days.

(21) Appl. No.: 18/903,514

(22) Filed: Oct. 1, 2024

(65) Prior Publication Data

US 2026/0094521 A1 Apr. 2, 2026

(51) Int. Cl.
*G08G 1/00* (2006.01)

(52) U.S. Cl.
CPC ................. *G08G 1/20* (2013.01); *G08G 1/22* (2013.01)

(58) Field of Classification Search
CPC .................................. G08G 1/20; G08G 1/22
See application file for complete search history.

(56) References Cited

U.S. PATENT DOCUMENTS 7,612,668 B2 11/2009 Harvey
7,999,670 B2 8/2011 Mcclellan et al.
9,096,244 B2 * 8/2015 Meyer .................... B60T 13/08
10,696,313 B2 * 6/2020 Paralikar ................ B61C 15/14
11,107,018 B2 * 8/2021 Light-Holets ........ G06Q 20/405
11,190,901 B1 11/2021 Makkiya et al.
11,360,488 B2 * 6/2022 Kline .................. B60W 30/162
11,393,260 B2 * 7/2022 Shekar ................. G07C 5/0808
11,572,067 B2 2/2023 Poulin et al.
11,703,884 B2 7/2023 Hille et al.
12,002,354 B2 * 6/2024 Hayashi ............... G08G 1/0112
12,004,038 B2 * 6/2024 Wang ................. G01C 21/3461
12,432,695 B2 * 9/2025 Li ......................... H04W 72/02
2003/0060938 A1 3/2003 Duvall
2004/0260467 A1 12/2004 Wehrlen et al.
2007/0115101 A1 5/2007 Creekbaum et al.
2009/0140886 A1 6/2009 Bender
2011/0301825 A1 12/2011 Grajkowski et al.
2012/0259537 A1 10/2012 Schmidt et al.
(Continued)

OTHER PUBLICATIONS

Zhang et al., Vehicle-controlled collision avoidance, 1996, IEEE, p. 1-9 (Year: 1996).*
(Continued)

*Primary Examiner* — McDieunel Marc
(74) *Attorney, Agent, or Firm* — Foley & Lardner LLP

(57) ABSTRACT

A vehicle system includes processing circuits configured to monitor locations of a plurality of vehicles relative to an area, control operation of a first vehicle of a first group of vehicles in a first group mode of operation when the location indicates that the first vehicle is located in the area, and control operation of a second vehicle of a second group of vehicles in a second group mode of operation when the location indicates that the second vehicle is located in the area. The first group mode of operation is different than the second group mode of operation such that operation of a respective vehicle of the plurality of vehicles is controlled based on whether the respective vehicle is associated with the first group of vehicles or the second group of vehicles and a location of the respective vehicle relative to the area.

20 Claims, 5 Drawing Sheets

(56) References Cited

U.S. PATENT DOCUMENTS

| | | | | |
|---|---|---|---|---|
| 2013/0238366 | A1 | 9/2013 | Morgan et al. | |
| 2016/0295361 | A1 | 10/2016 | Jelle | |
| 2018/0065481 | A1 | 3/2018 | Morisset et al. | |
| 2019/0193682 | A1 | 6/2019 | Santiano et al. | |
| 2019/0248360 | A1 | 8/2019 | Correia et al. | |
| 2019/0253835 | A1 | 8/2019 | Jones | |
| 2019/0364381 | A1 | 11/2019 | Weston et al. | |
| 2020/0158029 | A1 | 5/2020 | Fletcher | |
| 2020/0371534 | A1* | 11/2020 | Ji | G05D 1/628 |
| 2021/0024100 | A1* | 1/2021 | Calleija | G08G 1/202 |
| 2021/0264792 | A1 | 8/2021 | Ren et al. | |
| 2022/0130254 | A1* | 4/2022 | Austin | H04W 4/46 |
| 2022/0303719 | A1 | 9/2022 | Makkiya et al. | |
| 2022/0306073 | A1 | 9/2022 | King | |
| 2023/0347899 | A1 | 11/2023 | Nagata et al. | |
| 2024/0061129 | A1 | 2/2024 | Boehm | |
| 2024/0144830 | A1* | 5/2024 | Kim | H04W 4/024 |
| 2024/0273553 | A1 | 8/2024 | Gong et al. | |

OTHER PUBLICATIONS

Cao et alo., Collaborative Kalman filters for vehicle tracking, 2011, IEEE, p. 1-6 (Year: 2011).*

Matsumoto et al., Fundamental study on effect of preceding vehicle information on fuel consumption reduction of a vehicle group, 2013, IEEE, p. 173-178 (Year: 2013).*

Michaud et al., Coordinated Maneuvering of Automated Vehicles in Platoons, 2006, IEEE, p. 437-447 (Year: 2006).*

* cited by examiner

VEHICLE CONTROL BASED ON GROUP AND LOCATION

BACKGROUND

Vehicles such as passenger vehicles and commercial vehicles may vary in size, weight, purpose, and maneuverability. Operators of these vehicles have different levels of credentials, experience, and qualifications. The differences between the vehicles and the operators controlling the vehicles can create challenges in areas that require attentive operation of the vehicle by the operator such as in high pedestrian traffic zones or hazardous environments where varying vehicle capabilities and operator experience impact safety and performance.

SUMMARY

One embodiment relates to a vehicle system for controlling operation of a plurality of vehicles. The vehicle system includes one or more processing circuits configured to monitor locations of the plurality of vehicles relative to an area, the plurality of vehicles including a first vehicle associated with a first group of vehicles and a second vehicle associated with a second group of vehicles, control operation of the first vehicle of the first group of vehicles in a first group mode of operation when the location indicates that the first vehicle is located in the area, and control operation of the second vehicle of the second group of vehicles in a second group mode of operation when the location indicates that the second vehicle is located in the area. The first group mode of operation is different than the second group mode of operation such that operation of a respective vehicle of the plurality of vehicles is controlled based on (i) whether the respective vehicle is associated with the first group of vehicles or the second group of vehicles and (ii) a location of the respective vehicle relative to the area.

Another embodiment relates to a vehicle system for controlling operation of a plurality of vehicles. The vehicle system includes one or more processing circuits comprising one or more memory devices coupled to one or more processors. The one or more memory devices are configured to store instructions thereon that, when executed by the one or more processors, cause the one or more processors to group each vehicle of the plurality of vehicles in a first group of vehicles or a second group of vehicles, limit operation of a first vehicle of the plurality of vehicles grouped in the first group of vehicles in a first group mode of operation, and limit operation of a second vehicle of the plurality of vehicles grouped in the second group of vehicles in a second group mode of operation. The first group mode of operation is different than the second group mode of operation such that operation of a respective vehicle of the plurality of vehicles is controlled based on whether the respective vehicle is grouped in the first group of vehicles or the second group of vehicles. The respective vehicle is grouped in the first group of vehicles or the second group of vehicles based on at least one of (i) a type of vehicle thereof or (ii) at least one of vehicle credentials associated with the respective vehicle or operator credentials of an operator associated with the respective vehicle.

Still another embodiment relates to a vehicle system for controlling operation of a plurality of vehicles. The vehicle system includes a non-transitory computer-readable medium having instructions stored thereon that, when executed by one or more processors, cause the one or more processors to monitor locations of the plurality of vehicles relative to an area, the plurality of vehicles including a first vehicle associated with a first group of vehicles and a second vehicle associated with a second group of vehicles, control operation of the first vehicle of the first group of vehicles in a first group mode of operation when the location indicates that the first vehicle is located in the area, and control operation of the second vehicle of the second group of vehicles in a second group mode of operation when the location indicates that the second vehicle is located in the area. The first group mode of operation is different than the second group mode of operation such that operation of a respective vehicle of the plurality of vehicles is controlled based on (i) whether the respective vehicle is associated with the first group of vehicles or the second group of vehicles and (ii) a location of the respective vehicle relative to the area.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

Overall Vehicle

Figure 1:
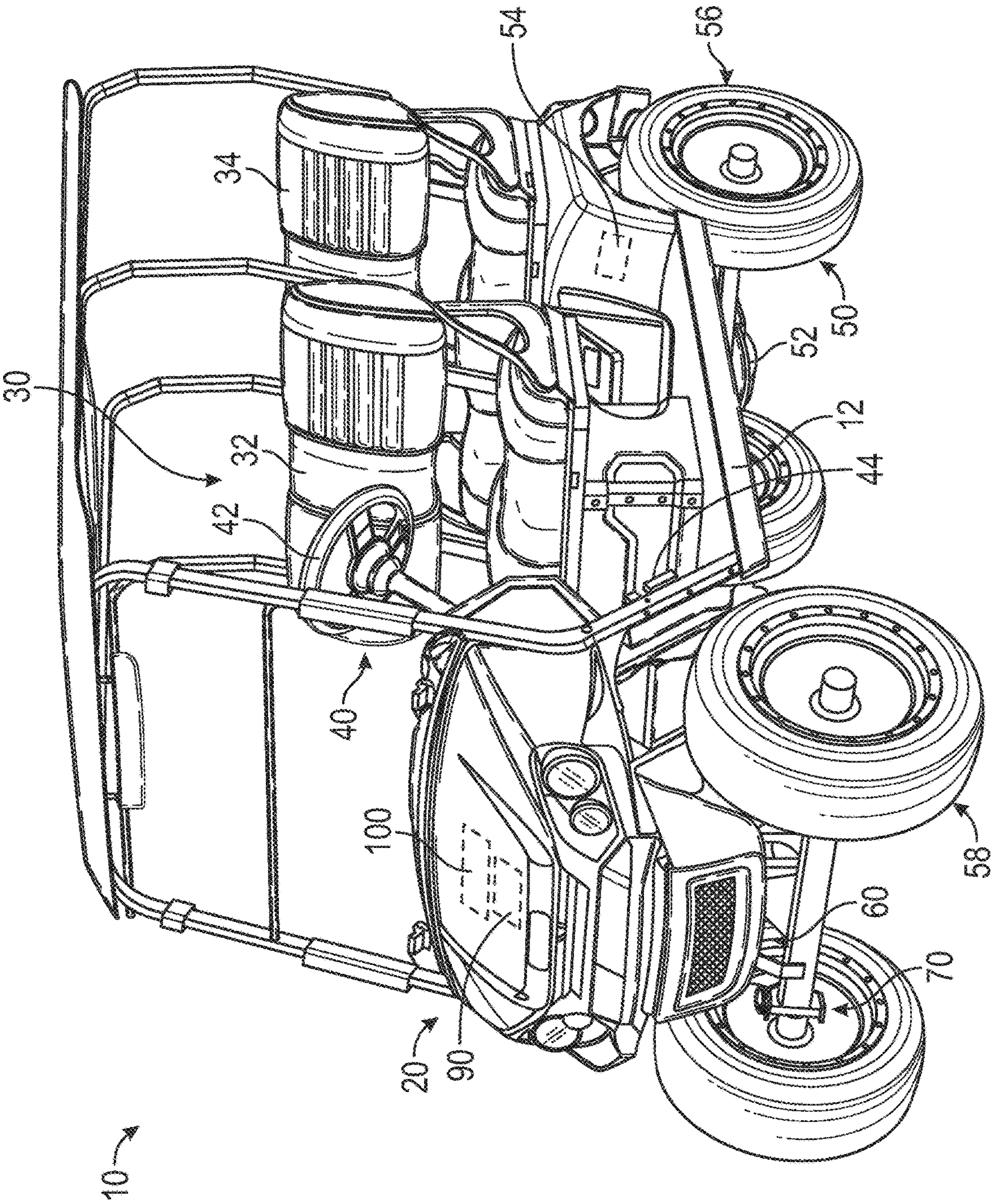
FIG. 1 is a perspective view of a vehicle, according to an exemplary embodiment.
Figure 2:
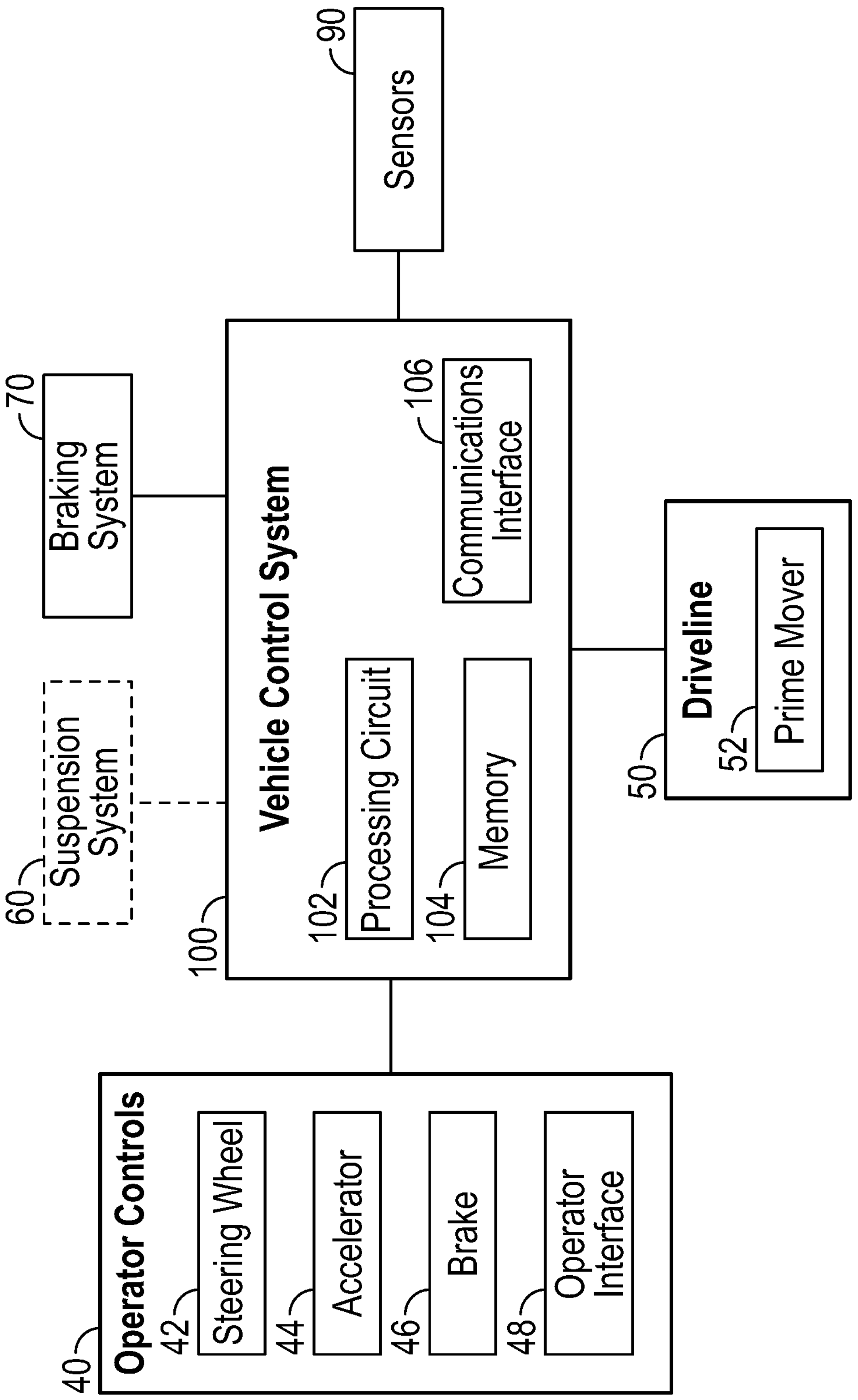
FIG. 2 is a schematic block diagram of the vehicle of FIG. 1, according to an exemplary embodiment.

As shown in FIGS. 1 and 2, a machine or vehicle, shown as vehicle 10, includes a chassis, shown as frame 12; a body assembly, shown as body 20, coupled to the frame 12 and having an occupant portion or section, shown as occupant seating area 30; operator input and output devices, shown as operator controls 40, that are disposed within the occupant seating area 30; a drivetrain, shown as driveline 50, coupled to the frame 12 and at least partially disposed under the body 20; a vehicle suspension system, shown as suspension system 60, coupled to the frame 12 and one or more components of the driveline 50; a vehicle braking system, shown as braking system 70, coupled to one or more components of the driveline 50 to facilitate selectively braking the one or more components of the driveline 50; one or more first sensors, shown as sensors 90; and a control system, shown as vehicle control system 100, coupled to the operator controls 40, the driveline 50, the suspension system 60, the braking system 70, and the sensors 90. In some embodiments, the vehicle 10 includes more or fewer components.

According to an exemplary embodiment, the vehicle 10 is an off-road machine or vehicle. In some embodiments, the off-road machine or vehicle is a lightweight or recreational machine or vehicle such as a golf cart, an all-terrain vehicle ("ATV"), a utility task vehicle ("UTV") (e.g., a hauler), a low speed vehicle ("LSV"), a personal transport vehicle ("PTV"), and/or another type of lightweight or recreational machine or vehicle. In some embodiments, the off-road machine or vehicle is a chore product such as a lawnmower, a turf mower, a push mower, a ride-on mower, a stand-on mower, aerator, turf sprayers, bunker rake, and/or another type of chore product (e.g., that may be used on a golf course). In some embodiments, the vehicle 10 is an on-road vehicle or a non-lightweight or recreational machine or vehicle such as a passenger vehicle (e.g., a sedan, a SUV, a pick-up truck, etc.), a commercial vehicle (e.g., trucks, shuttles, buses, delivery vehicles, etc.), a large machine (e.g., tractors, construction machinery, agricultural machinery, etc.), etc.

According to the exemplary embodiment shown in FIG. 1, the occupant seating area 30 includes a plurality of rows of seating including a first row of seating, shown as front row seating 32, and a second row of seating, shown as rear row seating 34. In some embodiments, the occupant seating area 30 includes a third row of seating or intermediate/middle row seating positioned between the front row seating 32 and the rear row seating 34. According to the exemplary embodiment shown in FIG. 1, the rear row seating 34 is facing forward. In some embodiments, the rear row seating 34 is facing rearward. In some embodiments, the occupant seating area 30 does not include the rear row seating 34. In some embodiments, in addition to or in place of the rear row seating 34, the vehicle 10 includes one or more rear accessories. Such rear accessories may include a golf bag rack, a bed, a cargo body (e.g., for a drink cart), and/or other rear accessories.

According to an exemplary embodiment, the operator controls 40 are configured to provide an operator with the ability to control one or more functions of and/or provide commands to the vehicle 10 and the components thereof (e.g., turn on, turn off, drive, turn, brake, engage various operating modes, raise/lower an implement, etc.). As shown in FIGS. 1 and 2, the operator controls 40 include a steering interface (e.g., a steering wheel, joystick(s), etc.), shown steering wheel 42, an accelerator interface (e.g., a pedal, a throttle, etc.), shown as accelerator 44, a braking interface (e.g., a pedal), shown as brake 46, and one or more additional interfaces, shown as operator interface 48. The operator interface 48 may include one or more displays and one or more input devices. The one or more displays may be or include a touchscreen, a LCD display, a LED display, a speedometer, gauges, warning lights, etc. The one or more input device may be or include buttons, switches, knobs, levers, dials, etc.

According to an exemplary embodiment, the driveline 50 is configured to propel the vehicle 10. As shown in FIGS. 1 and 2, the driveline 50 includes a primary driver, shown as prime mover 52, an energy storage device, shown as energy storage 54, a first tractive assembly (e.g., axles, wheels, tracks, differentials, etc.), shown as rear tractive assembly 56, and a second tractive assembly (e.g., axles, wheels, tracks, differentials, etc.), shown as front tractive assembly 58. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system. According to the exemplary embodiment shown in FIG. 1, the rear tractive assembly 56 includes rear tractive elements and the front tractive assembly 58 includes front tractive elements that are configured as wheels. In some embodiments, the rear tractive elements and/or the front tractive elements are configured as tracks.

According to an exemplary embodiment, the prime mover 52 is configured to provide power to drive the rear tractive assembly 56 and/or the front tractive assembly 58 (e.g., to provide front-wheel drive, rear-wheel drive, four-wheel drive, and/or all-wheel drive operations). In some embodiments, the driveline 50 includes a transmission device (e.g., a gearbox, a continuous variable transmission ("CVT"), etc.) positioned between (a) the prime mover 52 and (b) the rear tractive assembly 56 and/or the front tractive assembly 58. The rear tractive assembly 56 and/or the front tractive assembly 58 may include a drive shaft, a differential, and/or an axle. In some embodiments, the rear tractive assembly 56 and/or the front tractive assembly 58 include two axles or a tandem axle arrangement. In some embodiments, the rear tractive assembly 56 and/or the front tractive assembly 58 are steerable (e.g., using the steering wheel 42). In some embodiments, both the rear tractive assembly 56 and the front tractive assembly 58 are fixed and not steerable (e.g., employ skid steer operations).

In some embodiments, the driveline 50 includes a plurality of prime movers 52. By way of example, the driveline 50 may include a first prime mover 52 that drives the rear tractive assembly 56 and a second prime mover 52 that drives the front tractive assembly 58. By way of another example, the driveline 50 may include a first prime mover 52 that drives a first one of the front tractive elements, a second prime mover 52 that drives a second one of the front tractive elements, a third prime mover 52 that drives a first one of the rear tractive elements, and/or a fourth prime mover 52 that drives a second one of the rear tractive elements. By way of still another example, the driveline 50 may include a first prime mover 52 that drives the front tractive assembly 58, a second prime mover 52 that drives a first one of the rear tractive elements, and a third prime mover 52 that drives a second one of the rear tractive elements. By way of yet another example, the driveline 50 may include a first prime mover 52 that drives the rear tractive assembly 56, a second prime mover 52 that drives a first one of the front tractive elements, and a third prime mover 52 that drives a second one of the front tractive elements.

According to an exemplary embodiment, the suspension system 60 includes one or more suspension components (e.g., shocks, dampers, springs, etc.) positioned between the frame 12 and one or more components (e.g., tractive elements, axles, etc.) of the rear tractive assembly 56 and/or the front tractive assembly 58. In some embodiments, the vehicle 10 does not include the suspension system 60.

According to an exemplary embodiment, the braking system 70 includes one or more braking components (e.g., disc brakes, drum brakes, in-board brakes, axle brakes, etc.) positioned to facilitate selectively braking one or more components of the driveline 50. In some embodiments, the one or more braking components include (i) one or more front braking components positioned to facilitate braking one or more components of the front tractive assembly 58 (e.g., the front axle, the front tractive elements, etc.) and (ii) one or more rear braking components positioned to facilitate braking one or more components of the rear tractive assembly 56 (e.g., the rear axle, the rear tractive elements, etc.). In some embodiments, the one or more braking components include only the one or more front braking components. In some embodiments, the one or more braking components include only the one or more rear braking components. In some embodiments, the one or more front braking components include two front braking components, one positioned to facilitate braking each of the front tractive elements. In some embodiments, the one or more rear braking components include two rear braking components, one positioned to facilitate braking each of the rear tractive elements. In some embodiments, electric regenerative braking is employed (e.g., via the prime mover 52, an electric motor, etc.) in combination with or instead of using the braking system 70 to facilitate braking of one or more components of the driveline 50.

The sensors 90 may include various sensors positioned about the vehicle 10 to acquire vehicle information or vehicle data regarding operation of the vehicle 10 and/or the location thereof. By way of example, the sensors 90 may include an accelerometer, a gyroscope, a compass, a position sensor (e.g., a GPS sensor, etc.), an inertial measurement unit ("IMU"), suspension sensor(s), wheel sensors, an audio sensor or microphone, a camera, an optical sensor, a proximity detection sensor, a Doppler sensor, and/or other sensors to facilitate acquiring vehicle information or vehicle data regarding operation of the vehicle 10 and/or the location thereof. According to an exemplary embodiment, one or more of the sensors 90 are configured to facilitate detecting and obtaining vehicle telemetry data including position of the vehicle 10, whether the vehicle 10 is moving, travel direction of the vehicle 10, slope of the vehicle 10, speed of the vehicle 10, vibrations experienced by the vehicle 10, sounds proximate the vehicle 10, suspension travel of components of the suspension system 60, and/or other vehicle telemetry data.

The vehicle control system 100 may be implemented as a general-purpose processor, an application specific integrated circuit ("ASIC"), one or more field programmable gate arrays ("FPGAs"), a digital-signal-processor ("DSP"), circuits containing one or more processing components, circuitry for supporting a microprocessor, a group of processing components, or other suitable electronic processing components. According to the exemplary embodiment shown in FIG. 2, the vehicle control system 100 includes a processing circuit 102, a memory 104, and a communications interface 106. The processing circuit 102 may include an ASIC, one or more FPGAs, a DSP, circuits containing one or more processing components, circuitry for supporting a microprocessor, a group of processing components, or other suitable electronic processing components. In some embodiments, the processing circuit 102 is configured to execute computer code stored in the memory 104 to facilitate the activities described herein. The memory 104 may be any volatile or non-volatile or non-transitory computer-readable storage medium capable of storing data or computer code relating to the activities described herein. According to an exemplary embodiment, the memory 104 includes computer code modules (e.g., executable code, object code, source code, script code, machine code, etc.) configured for execution by the processing circuit 102. In some embodiments, the vehicle control system 100 may represent a collection of processing devices. In such cases, the processing circuit 102 represents the collective processors of the devices, and the memory 104 represents the collective storage devices of the devices.

In one embodiment, the vehicle control system 100 is configured to selectively engage, selectively disengage, control, or otherwise communicate with components of the vehicle 10 (e.g., via the communications interface 106, a controller area network ("CAN") bus, etc.). According to an exemplary embodiment, the vehicle control system 100 is coupled to (e.g., communicably coupled to) components of the operator controls 40 (e.g., the steering wheel 42, the accelerator 44, the brake 46, the operator interface 48, etc.), components of the driveline 50 (e.g., the prime mover 52), components of the braking system 70, and the sensors 90. By way of example, the vehicle control system 100 may send and receive signals (e.g., control signals, location signals, etc.) with the components of the operator controls 40, the components of the driveline 50, the components of the braking system 70, the sensors 90, and/or remote systems or devices (via the communications interface 106 as described in greater detail herein).

Fleet Monitoring and Control System

Figure 3:
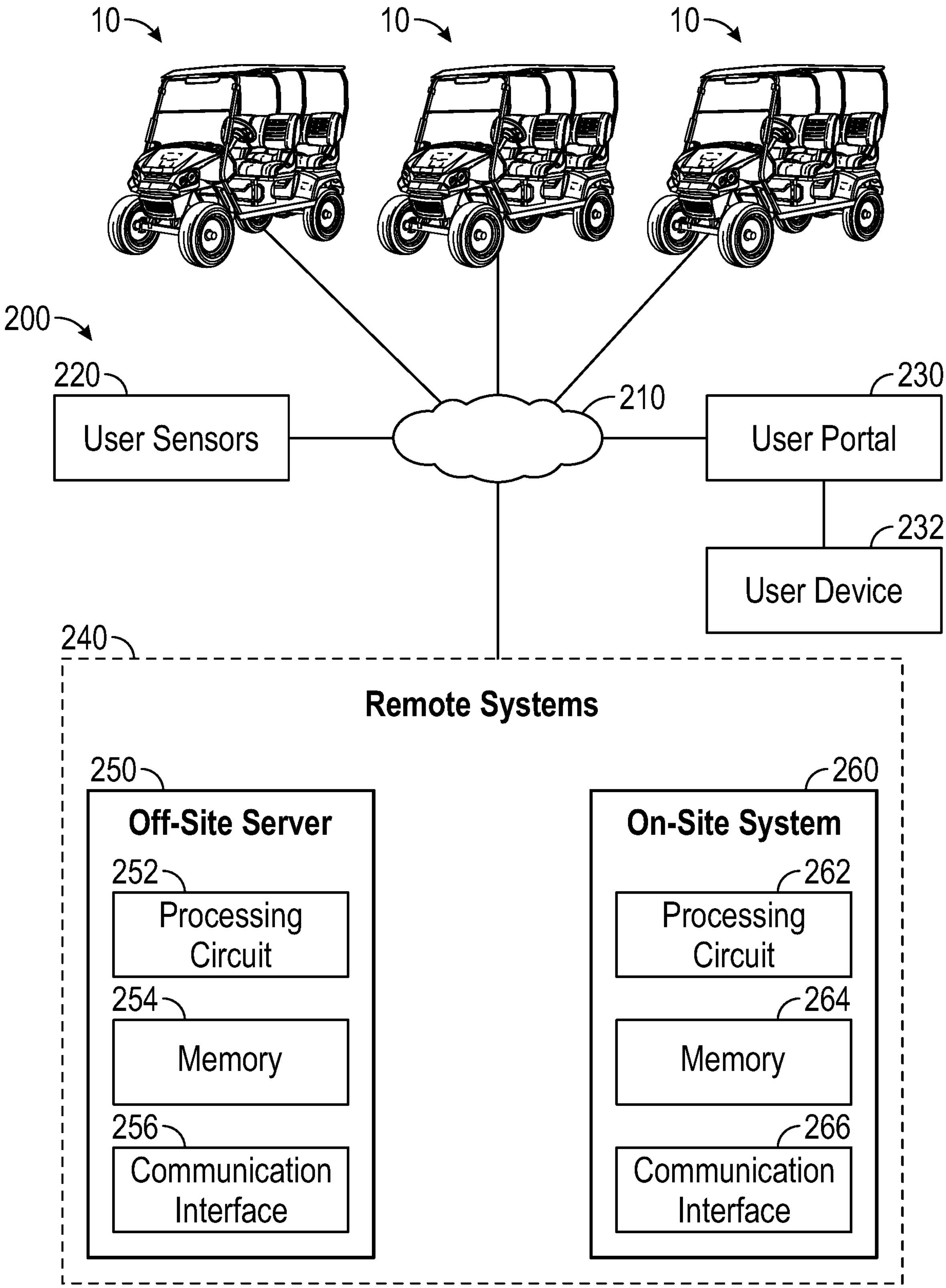
FIG. 3 is a schematic block diagram of a fleet monitoring and control system including a plurality of the vehicles of FIG. 1, according to an exemplary embodiment.

As shown in FIG. 3, a monitoring and control system, shown as fleet monitoring and control system 200, includes one or more vehicles 10; one or more second sensors, shown as user sensors 220, positioned remote or separate from the vehicles 10; an operator interface, shown as user portal 230, positioned remote or separate from the vehicles 10; an external or remote user device, shown as user device 232, positioned remote or separate from the vehicles 10; and one or more external processing systems, shown as remote systems 240, positioned remote or separate from the vehicles 10. The vehicles 10, the user sensors 220, the user portal 230, and the remote systems 240 communicate via one or more communications protocols (e.g., Bluetooth, Wi-Fi, cellular, radio, through the Internet, etc.) through a network, shown as communications network 210. In some embodiments, the fleet monitoring and control system 200 does not includes the user portal 230 and/or the user device 232.

The user sensors 220 may be or include one or more sensors that are carried by or worn by an operator of one of the vehicles 10. By way of example, the user sensors 220 may be or include a wearable sensor (e.g., a smartwatch, a fitness tracker, a pedometer, a heart rate monitor, etc.) and/or a sensor that is otherwise carried by the operator (e.g., a smartphone, etc.) that facilitates acquiring and monitoring operator data (e.g., physiological conditions such a temperature, heartrate, breathing patterns, etc.; location; movement; etc.) regarding the operator. The user sensors 220 may communicate directly with the vehicles 10, directly with the remote systems 240, and/or indirectly with the remote systems 240 (e.g., through the vehicles 10 as an intermediary).

The user portal 230 may be configured to facilitate operator access to dashboards including the vehicle data, the operator data, information available at the remote systems 240, etc. to manage and operate the site (e.g., golf course)

such as for advanced scheduling purposes, to identify persons breaking course guidelines or rules, to monitor locations of the vehicles 10, etc. The user portal 230 may also be configured to facilitate operator implementation of configurations and/or parameters for the vehicles 10 and/or the site (e.g., setting speed limits, setting geofences, etc.). As shown in FIG. 3, the user portal 230 is accessible via the user device 232. The user device 232 may be or include a computer, laptop, smartphone, tablet, or the like. The user portal 230 and the user device 232 may communicate via one or more communications protocols (e.g., Bluetooth, Wi-Fi, cellular, radio, through the Internet, wired connection, etc.) through a network (e.g., a CAN bus, the communications network 210, etc.). The user device 232 includes a display (e.g., a screen, etc.) configured to display one or more graphical user interfaces ("GUIs") of the user portal 230.

As shown in FIG. 3, the remote systems 240 include a first remote system, shown as off-site server 250, and a second remote system, shown as on-site system 260 (e.g., in a clubhouse of a golf course, on the golf course, etc.). In some embodiments, the remote systems 240 include only one of the off-site server 250 or the on-site system 260. As shown in FIG. 3, (a) the off-site server 250 includes a processing circuit 252, a memory 254, and a communications interface 256 and (b) the on-site system 260 includes a processing circuit 262, a memory 264, and a communications interface 266.

According to an exemplary embodiment, the remote systems 240 (e.g., the off-site server 250 and/or the on-site system 260) are configured to communicate with the vehicles 10 and/or the user sensors 220 via the communications network 210. By way of example, the remote systems 240 may receive the vehicle data from the vehicles 10 and/or the operator data from the user sensors 220. The remote systems 240 may be configured to perform back-end processing of the vehicle data and/or the operator data. The remote systems 240 may be configured to monitor various global positioning system ("GPS") information and/or real-time kinematics ("RTK") information (e.g., position/location, speed, direction of travel, geofence related information, etc.) regarding the vehicles 10 and/or the user sensors 220. The remote systems 240 may be configured to transmit information, data, commands, and/or instructions to the vehicles 10. By way of example, the remote systems 240 may be configured to transmit GPS data and/or RTK data based on the GPS information and/or RTK information to the vehicles 10 (e.g., which the vehicle control systems 100 may use to make control decisions). By way of another example, the remote systems 240 may send commands or instructions to the vehicles 10 to implement.

According to an exemplary embodiment, the remote systems 240 (e.g., the off-site server 250 and/or the on-site system 260) are configured to communicate with the user portal 230 via the communications network 210. By way of example, the user portal 230 may facilitate (a) accessing the remote systems 240 to access data regarding the vehicles 10 and/or the operators thereof and/or (b) configuring or setting operating parameters for the vehicles 10 (e.g., geofences, speed limits, times of use, permitted operators, etc.). Such operating parameters may be propagated to the vehicles 10 by the remote systems 240 (e.g., as updates to settings) and/or used for real time control of the vehicles 10 by the remote systems 240.

Vehicle Control Based on Group

It should be understood that any of the functions or processes described herein with respect to the fleet monitoring and control system 200 may be performed by the vehicle control system 100 and/or the remote systems 240. By way of example, data collection may be performed by the vehicle control system 100 and data analytics may be performed by the vehicle control system 100. By way of another example, data collection may be performed by the vehicle control system 100 and data analytics may be performed by the remote systems 240. By way of yet another example, data collection may be performed by the vehicle control system 100, a first portion of data analytics may be performed by the vehicle control system 100, and a second portion of data analytics may be performed by the remote systems 240. By way of still another example, a first portion of data collection may be performed by the vehicle control system 100, a second portion of data collection may be performed by the remote systems 240, and data analytics may be performed by the vehicle control system 100 and/or the remote systems 240.

Figure 4:
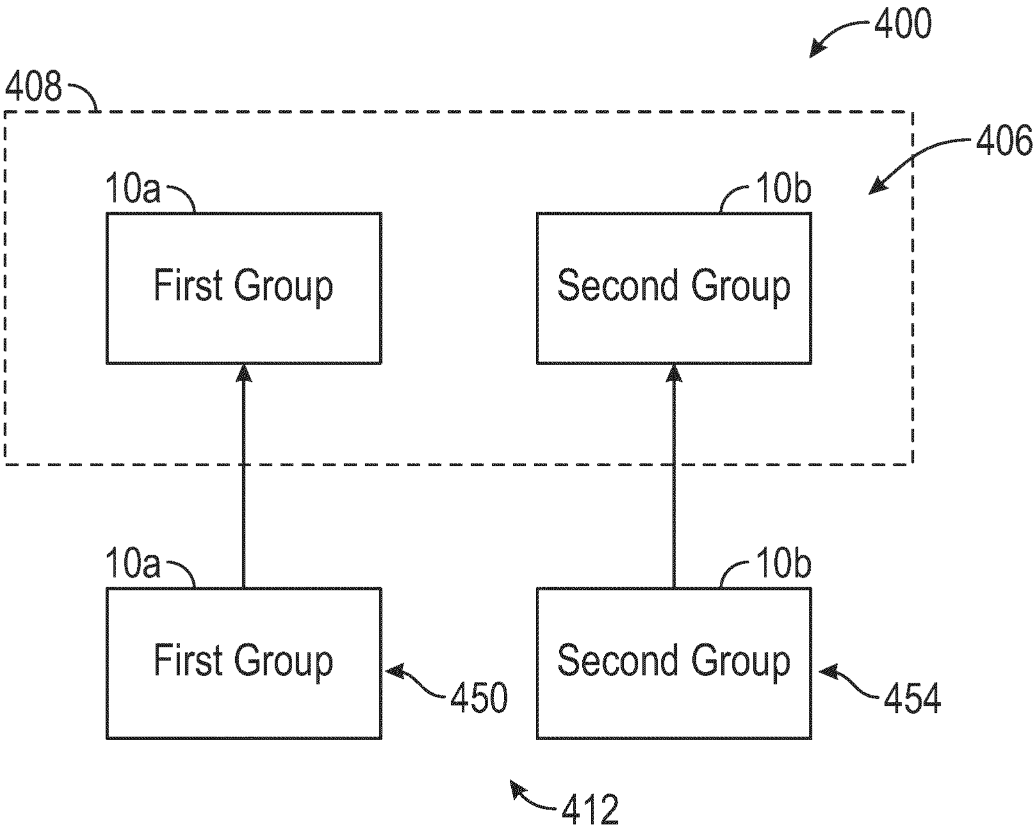
FIGS. 4 and 5 are top views of an area including the vehicles of FIG. 1 and a plurality of geofences, according to an exemplary embodiment.
Figure 5:
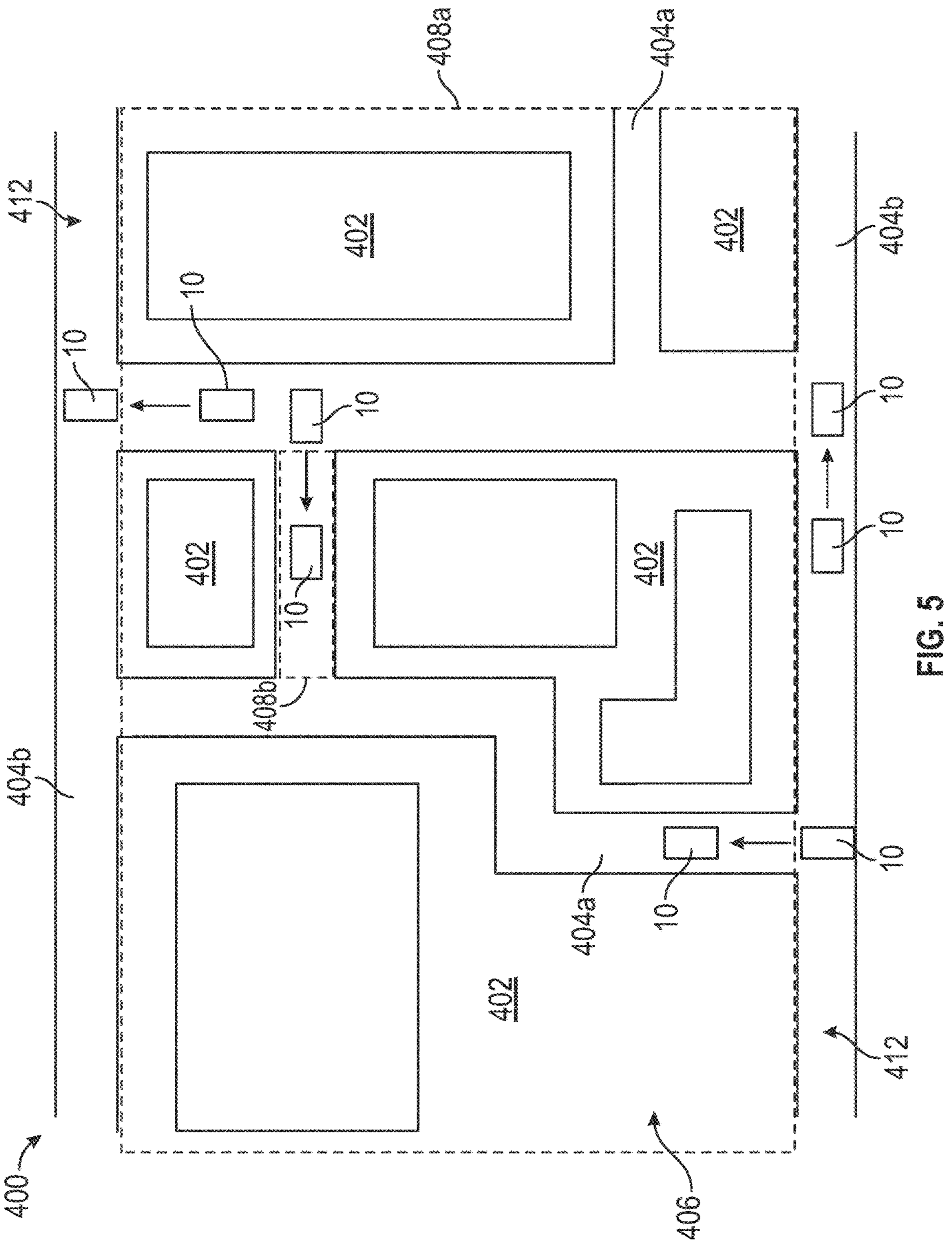

As shown in FIGS. 4 and 5, the vehicles 10 are configured to be driven by an operator around an operation zone, shown as area 400. As shown in FIG. 5, the area 400 includes a community (e.g., neighborhood, city, apartment/condominium complex, etc.), a school campus (e.g., university campus), etc., including buildings, recreational areas, play grounds, etc., shown as spaces 402 and pathways (e.g., highways, freeways, alleys, parking lots, streets, roads, paths, sidewalks, etc.), shown as paths 404, upon which one or more of the vehicles 10 may be driven or travel. In some embodiments, the area 400 includes a work site (e.g., construction site), a golf course, among other areas where vehicles 10 are commonly driven. By way of example, the vehicle 10 may be a shuttle, a bus, a taxi, etc. driven along the paths 404 on a school or business campus by an operator to transport people from one location to another location (e.g., to transport students between different locations on campus, transport employees between different locations on the campus, etc.). By way of another example, the vehicle 10 may be a PTV driven along the paths 404 by an operator living in a community between different locations (e.g., a house, a store, a park, etc.) within the community. By way of another example, the vehicle 10 may be a UTV or maintenance vehicle driven by a maintenance person on a school or business campus.

As shown in FIGS. 4 and 5, the area 400 navigable by the vehicle 10 includes areas such as the spaces 402 and a first subset of the paths 404, shown as paths 404*a*, and a second subset of the paths 404, shown as paths 404*b*. According to an exemplary embodiment, the spaces 402 and/or the paths 404*a* are portions of the area 400 (i) that should not be driven in/on with the vehicle 10, (ii) that require that the operator have certain credentials to drive in with the vehicle 10, (iii) that require that the vehicle 10 be a certain type or group of permitted vehicle, and/or (iv) that require attentive operation of the vehicle 10 by the operator (e.g., necessitates a reduced speed; because the areas include obstacles such as people walking, buildings, hazards, etc.; etc.). By way of example, the spaces 402 may include pedestrian zones (e.g., sidewalks, parks, etc.), private property, construction sites, areas including buildings, certain areas of a golf course (e.g., a tee box, an out-of-bounds area, a green, a club house, etc.), gated communities, high security areas (e.g., surrounding a venue during a sporting event, concert, etc.), hazardous areas (e.g., areas storing materials such as gasoline, propane, oil, or other flammable or toxic materials), etc. Driving in the spaces 402 with the vehicle 10 may be dangerous for an operator of the vehicle 10, be dangerous for people inside the spaces 402 and surrounding the vehicle 10, damage the vehicle 10 and/or the spaces 402, etc. Similarly, driving along the paths 404*a* may require attentive operation of the vehicle 10 by the operator (e.g., due to pedestrian traffic surrounding the paths 404*a*, the paths 404*a* being narrow, the paths 404*a* including frequent turns, etc.). Collectively, the areas that should not be driven in by the vehicle 10 (e.g., the spaces 402) and/or that require attentive operation of the vehicle 10 by the operator (e.g., the paths 404*a*) are hereinafter referred to as limited operation areas 406. As shown in FIGS. 4 and 5, one or more geofences (e.g., a virtual boundary, a virtual fence, a virtual box, etc.), shown as geofences 408, are established around the limited operation areas 406. As shown in FIG. 5, the geofences 408 includes a first geofence, shown as outer geofence 408*a*, and a second geofence, shown as inner geofence 408*b*, established around the paths 404*a* within the outer geofence 408*a* and the limited operation areas 406. In some embodiments, the sub-area surrounded by the inner geofence 408*b* is a restricted operation area. In some embodiments, the area 400 does not include the inner geofence 408*b*.

The geofences 408 may be zones or boundaries defined around and/or within the limited operation areas 406 to control and manage the operation of the vehicles 10 in the area 400. By way of example, when the vehicle 10 is driven beyond the virtual boundary of the outer geofence 408*a* (i.e., driven into the limited operation area 406), the operation of the prime mover 52 of the vehicle 10 may be limited (e.g., limit speeds below a speed threshold such as below 5 miles per hour, prevent forward travel of the vehicle 10, limit the vehicle 10 to backward travel only, disabled, limited or restricted operation, etc.). Areas such as the paths 404*b* (e.g., the paths 404 that are outside of the limited operation area 406) along which the vehicle 10 is permitted to travel along (e.g., streets, alleys, parking lots, portions of a golf course (e.g., a fairway, a cart path, a cart return area, etc.), etc.) that are not limited operation areas 406 defined by the geofences 408 (e.g., areas outside of the limited operation areas 406) may be drivable (e.g., navigable, permitted, unrestricted operation, etc.) by the vehicle 10, and are hereinafter referred to as the drivable areas 412.

According to an exemplary embodiment, a location of the vehicle 10 is monitored by the fleet monitoring and control system 200 to determine the location of the vehicle 10 relative to the geofences 408, the limited operation areas 406, and the drivable areas 412. The location of the vehicle 10 may be determined based on GPS data (e.g., collected by the sensors 90 and/or the user sensors 220). The fleet monitoring and control system 200 may be configured to store the location data and analyze the location data to make operational decisions based thereon. By way of example, the fleet monitoring and control system 200 may be configured to control operation of the vehicle 10 based on the real-time location data, control operation of the vehicle 10 based on a history of the location data (e.g., based on one or more patterns in the location data determined over time), control operation of a fleet of the vehicles 10 based on the history of the location data, control operation of one or more sub-sets (e.g., groups) of vehicles 10 based on the type (e.g., a golf cart, an ATV, a UTV, an LSV, a PTV, etc.) or group designation (e.g., a first vehicle 10*a* of a first group, a second vehicle 10*b* of a second group, etc.) of the vehicle 10, etc.

In some embodiments, a true location (e.g., real-time position, actual location, etc.) of the vehicle 10 is different than a tracked location of the vehicle 10 determined based on the GPS data. The error or difference between the tracked location of the vehicle 10 and the true location of the vehicle 10 may be caused by signal interference (e.g., geomagnetic radiation), solar storms, signal obstruction (e.g., tree cover, building cover, etc.), weather (e.g., rain, snow, pressure, etc.), control system quality, malfunctioning sensors, and/or any other combination of internal hardware or external factors. The difference between the tracked location and the true location may be referred to herein as location or GPS drift. Because of the difference between the tracked location and the true location, the fleet monitoring and control system 200 may determine, based on the GPS position, that the vehicle 10 is operating in a limited operation area 406 (e.g., an area defined by a geofence, a non-drivable area, etc.) when in reality, the true location of the vehicle 10 is not in the limited operation area 406. In such an example, the fleet monitoring and control system 200 may undesirably limit the operation of the vehicle 10. Similarly, because of the difference between the tracked location and the true location, the fleet monitoring and control system 200 may determine, based on the GPS position, that the vehicle 10 is not operating in the limited operation area 406 (e.g., operating in the drivable area 412) when in reality, the true location of the vehicle 10 is in the limited operation area 406. In such an example, the fleet monitoring and control system 200 may undesirably permit operation of the vehicle 10 within the limited operation area 406.

According to an exemplary embodiment, the fleet monitoring and control system 200 is configured to correct (e.g., adjust for, account for, etc.) the undesirable controlling of the operation of the vehicles 10 as a result of the GPS drift. By way of example, the fleet monitoring and control system 200 may be configured to force the tracked location to be within the drivable area 412 in response to a determination, based on the true location, that the vehicle 10 is traveling in the drivable area 412 and the tracked location indicates that the vehicle 10 is in the limited operation area 406. By way of another example, the fleet monitoring and control system 200 may be configured to force the tracked location to be within the limited operation area 406 in response to a determination, based on the true location, that the vehicle 10 is traveling in the limited operation area 406 and the tracked location indicates that the vehicle 10 is in the drivable area 412. By way of another example, the fleet monitoring and control system 200 may be configured to control operation of the vehicle 10 based on a corrective position determined using RTK information. In such an example, the corrective position may be based on corrective position data determined based on (i) communications between the on-site system 260 and a satellite (e.g., a global navigation satellite system (GNSS) satellite) and (ii) a known, fixed location of the on-site system 260. By way of yet another example, the fleet monitoring and control system 200 may be configured to control operation of the vehicle 10 based on the type of surface the vehicle 10 is driving on. In some embodiments, when a determination is made that the true location is different than the tracked location (e.g., the coordinates are different), the fleet monitoring and control system 200 may be configured to recalibrate (e.g., reset) the sensors 90 collecting the GPS data and/or send a signal commanding the user sensors 220 to recalibrate.

The fleet monitoring and control system 200 may control an operation of the operator controls 40, the driveline 50, the suspension system 60, the braking system 70, and/or any other component of the vehicle 10 based on the true location (e.g., a corrected position, an actual location, etc.) of the vehicle 10 relative to the limited operation areas 406 and the drivable areas 412. By way of example, the fleet monitoring and control system 200 may determine, based on the true location, that the vehicle 10 is operating (e.g., driving forward, driving backward, idling, stopped, parked, etc.) (i) in a drivable area 412 defined by a respective geofence 408, (ii) near a respective geofence 408 (e.g., within 5 yards of the respective geofence 408, within 10 yards of the respective geofence 408, etc.), or (iii) in a limited operation area 406 defined by a respective geofence 408.

In response to a determination that the vehicle 10 is operating in a drivable area 412, the fleet monitoring and control system 200 may facilitate normal or unrestricted operation (e.g., permit operation of the vehicle 10 in a first mode of operation) of the operator controls 40, the driveline 50, the suspension system 60, the braking system 70, and/or any other component of the vehicle 10. In response to a determination that the vehicle 10 is operating in or near a limited operation area 406 (e.g., near or in the geofence 408), the fleet monitoring and control system 200 may (i) limit operation (e.g., limit operation of the vehicle 10 in a second mode of operation) of the operator controls 40, the driveline 50, the suspension system 60, the braking system 70, and/or any other component of the vehicle 10 and/or (ii) provide an alert (e.g., visually or audibly via the operator interface 48, in a tactile manner by shaking the steering wheel 42, etc.) to the operator of the vehicle 10 indicative of the location of the limited operation area 406 (e.g., a boundary of the geofence 408). By way of example, the fleet monitoring and control system 200 may limit operation of the prime mover 52 such that the vehicle 10 (i) cannot exceed a threshold speed (e.g., 15 miles per hour, 10 miles per hour, 5 miles per hour, 2 miles per hour, etc.), (ii) is limited to rearward travel, and/or (iii) any other control to limit operation of the vehicle 10. In such an example, to transition the vehicle 10 to the second mode of operation, the fleet monitoring and control system 200 may (i) shift the vehicle 10 into neutral (e.g., such that no power is transmitted to the prime mover 52), (ii) limit or reduce operability of the prime mover 52, and/or (iii) operate the braking system 70 or engage regenerative braking to slow the vehicle 10 (e.g., to at or below the speed threshold, to a stop, etc.). The vehicle 10 may be limited to the second mode of operation until the vehicle 10 navigates (e.g., is navigated by an operator) to the drivable area 412.

In some embodiments, the fleet monitoring and control system 200 is configured to control operation of the prime mover 52 (e.g., drive the rear tractive assembly 56 and/or the front tractive assembly 58 to accelerate the vehicle 10) and/or operate the braking system 70 based on sensor data acquired by the sensors 90 and/or the user sensors 220. By way of example, responsive to a determination that the vehicle 10 is driving too slow while traveling up a hill, the fleet monitoring and control system 200 may control operation of the prime mover 52 to drive the rear tractive assembly 56 and/or the front tractive assembly 58 to accelerate the vehicle 10. By way of another example, responsive to a determination that the vehicle 10 is approaching a stop sign, a yield sign, a stop light, etc., the fleet monitoring and control system 200 may control operation of the braking system 70 and/or the prime mover 52 to slow or stop the vehicle 10. By way of yet another example, responsive to a determination (e.g., based on location data acquired by the sensors 90 and/or the user sensors 220) that the vehicle 10 is operating within a geofence 408 and a determination (e.g., based on speed data acquired by the sensors 90 and/or the user sensors 220) that the vehicle 10 is traveling at a speed greater than a threshold speed associated with the geofence 408, the fleet monitoring and control system 200 may (i) shift the vehicle 10 into neutral (e.g., such that no power is transmitted to the prime mover 52), (ii) limit or reduce operability of the prime mover 52, and/or (ii) operate the braking system 70 or engage regenerative braking to slow the vehicle 10.

In some embodiments, in response to a determination that the vehicle 10 is operating in a drivable area 412, the fleet monitoring and control system 200 may limit operation (e.g., limit operation of the vehicle 10 in a third mode of operation that is less limiting than the second mode of operation, limit operation of the vehicle 10 in a third mode of operation that is more limiting than the first mode of operation, etc.) of the operator controls 40, the driveline 50, the suspension system 60, the braking system 70, and/or any other component of the vehicle 10. By way of example, the fleet monitoring and control system 200 may limit operation of the prime mover 52 such that the vehicle 10 cannot exceed a threshold speed that is less than a maximum threshold speed of the vehicle 10. In other words, the threshold speed may be less than the maximum threshold speed such that, in the third mode of operation, the vehicle 10 cannot reach the maximum threshold speed. The maximum threshold speed of a vehicle 10 may include a mandated or fixed threshold speed above which (e.g., faster than which) (i) may be dangerous to operate the vehicle 10, (ii) may require (e.g., by law) the vehicle 10 to include safety features such as seatbelts, head lights, tail lights, turn signals, etc., and/or (iii) may require (e.g., by law) the vehicle 10 to pass certain regulations (e.g., safety regulations, vehicle registration regulations, etc.).

In embodiments where the fleet monitoring and control system 200 (i) permits unrestricted operation of the vehicle 10 or operation in the first mode of operation when the location indicates that the vehicle 10 is located outside of an area defined by the geofence 408 (e.g., located outside of the boundaries of the geofence 408 defining the limited operation area 406, located in the drivable area 412) and (ii) limits operation of the vehicle 10 to the second mode of operation when the location indicates that the vehicle 10 is located within an area defined by the geofence 408 (e.g., located within the boundaries of the outer geofence **408*a* defining the limited operation area 406, located in the drivable area 412, located in the limited operation area 406), when the vehicle 10 crosses the boundary from within the geofence 408 to outside of the geofence 408, the fleet monitoring and control system 200 is configured to remove any limits imposed on the operation of the vehicle 10. By way of example, the fleet monitoring and control system 200 may transition from controlling the vehicle 10 in the second mode of operation to controlling the vehicle 10 in the first mode of operation when the vehicle 10 leaves the limited operation area 406 and enters the drivable area 412 (see, e.g., FIG. 5). By way of example, as shown in FIG. 5, when the vehicle 10 enters the drivable area 412 (e.g., drives from a path 404*a* within the geofence 408 onto a path 404*b* outside of the geofence 408), the fleet monitoring and control system 200 may remove limits imposed on the operation of the vehicle 10 (e.g., such that the vehicle 10 can operate at a speed limit associated with the path 404*b*, such that the vehicle 10 can drive along the path 404*b* without inhibiting a flow of traffic along the path 404*b***, etc.).

In embodiments where the fleet monitoring and control system 200 limits operation of the vehicle 10 to the third mode of operation when the location indicates that the vehicle 10 is located outside of an area defined by the geofence 408 (e.g., located outside of the boundaries of the geofence 408 defining the limited operation area 406, located in the drivable area 412), when the vehicle 10 crosses the boundary from inside of the geofence 408 to outside the geofence 408 (see, e.g., FIG. 5), the fleet monitoring and control system 200 is configured to remove limits imposed on the operation of the vehicle 10 (e.g., transition from controlling the vehicle 10 in the second mode of operation to controlling the vehicle 10 in the third mode of operation or to a mode of operation that is less limiting than the second mode of operation, etc.). By way of example, when the location indicates that the vehicle 10 is outside of the geofence 408 and the vehicle 10 is controlled according to the third mode of operation, the fleet monitoring and control system 200 may limit operation of the prime mover 52 such that the vehicle 10 cannot exceed a first threshold speed that is less than the maximum speed of the vehicle 10, and when the location indicates that the vehicle 10 is within the geofence 408, the fleet monitoring and control system 200 may further limit operation of the prime mover 52 such that the vehicle 10 cannot exceed a second threshold speed less than the first threshold speed.

In some embodiments, when the vehicle 10 is located within the outer geofence 408*a* and outside of the inner geofence 408*b*, the fleet monitoring and control system 200 limits operation of the vehicle 10 to the second mode of operation, and when the vehicle 10 is located within the inner geofence 408*b*, the fleet monitoring and control system 200 further limits operation of the vehicle 10 to a mode of operation (e.g., a fourth mode of operation) that is more restrictive than the second mode of operation. By way of example, when the location indicates that the vehicle 10 is operating within the limited operation area 406 defined by the outer geofence 408*a*, the fleet monitoring and control system 200 may limit operation of the vehicle 10 such that the vehicle 10 cannot exceed the second threshold speed. Further, in such an example, when the location indicates that the vehicle 10 is operating within a restricted operation area defined by the inner geofence 408*b* (e.g., the vehicle 10 has crossed a boundary of the inner geofence 408*b* and entered the inner geofence 408*b*), the fleet monitoring and control system 200 may limit operation of the vehicle 10 such that movement thereof is disabled (e.g., no power is transmitted to the prime mover 52, the braking system 70 stops the vehicle 10, etc.) or limit operation of the prime mover 52 such that the vehicle 10 cannot exceed a third threshold speed less than the second threshold speed. In other embodiments, when the vehicle 10 is located within the outer geofence 408*a* and outside of the inner geofence 408*b*, the fleet monitoring and control system 200 limits operation of the vehicle 10 to the second mode of operation, and when the vehicle 10 is located within the inner geofence 408*b*, the fleet monitoring and control system 200 removes operational limits imposed on the vehicle 10 (e.g., transitions the vehicle 10 to a mode of operation that is less restrictive than the second mode of operation, transitions the vehicle 10 to an unrestricted mode of operation, etc.). By way of example, when the location indicates that the vehicle 10 is operating within the limited operation area 406 defined by the outer geofence 408*a*, the fleet monitoring and control system 200 may limit operation of the vehicle 10 such that the vehicle 10 cannot exceed the second threshold speed. Further, in such an example, when the location indicates that the vehicle 10 is operating within an area defined by the inner geofence 408*b* (e.g., the vehicle 10 has crossed a boundary of the inner geofence 408*b* and entered the inner geofence 408*b*), the fleet monitoring and control system 200 may increase a performance of the vehicle 10 such that the vehicle 10 can operate at or below a threshold speed (e.g., the first threshold speed, the maximum threshold speed, etc.) that is greater than the second threshold speed.

As shown in FIG. 4, the vehicles 10 are configured to be grouped in (e.g., assigned to, designated in, etc.) one or more sub-sets (e.g., groups) of the vehicles 10, shown as first group 450 and second group 454. While shown as including the first group 450 and the second group 454, it should be understood that any number of groups may be formed or generated for the vehicles 10. A first vehicle 10*a* of a fleet of vehicles 10 is shown grouped in the first group 450 and operable in a first group mode of operation, and a second vehicle 10*b* of the fleet of vehicles 10 is shown grouped in the second group 454 and operable in a second group mode of operation. The fleet monitoring and control system 200 may be configured to transition the first group mode of operation and the second group mode of operation between the first mode of operation, the second mode of operation, and/or the third mode of operations depending on the location of the first vehicle 10*a* and the second vehicle 10*b*, respectively, relative to the geofences 408. By way of example, (i) responsive to the first vehicle 10*a* operating outside of the limited operation area 406, the fleet monitoring and control system 200 may transition the first group mode of operation to the first mode of operation (e.g., unrestricted operation) or the third mode of operation and (ii) responsive to the first vehicle 10*a* operating within the limited operation area 406, the fleet monitoring and control system 200 may transition the first group mode of operation to the second mode of operation. Similarly, (i) responsive to the second vehicle 10*b* operating outside of the limited operation area 406, the fleet monitoring and control system 200 may transition the second group mode of operation to the first mode of operation (e.g., unrestricted operation) or the third mode of operation and (ii) responsive to the second vehicle 10*b* operating within the limited operation area 406, the fleet monitoring and control system 200 may transition the second group mode of operation to the second mode of operation.

According to an exemplary embodiment, the fleet monitoring and control system 200 is configured to control operation of the vehicle 10 (e.g., permit or limit) depending on the group (e.g., the first group 450 or the second group 454) in which the vehicle 10 is grouped. By way of example, as shown in FIG. 5, if the first vehicle 10*a* in the first group 450 crosses a boundary defined by the outer geofence 408*a* (e.g., from the limited operation area 406 to the drivable area 412 or from the drivable area 412 to the limited operation area 406), the first group mode of operation may be transitioned between the first mode of operation, the second mode of operation, and/or the third mode of operation. Similarly, if the second vehicle 10*b* in the second group 454 crosses a boundary defined by the outer geofence 408*a* (e.g., from the limited operation area 406 to the drivable area 412 or from the drivable area 412 to the limited operation area 406), the second group mode of operation may be transitioned between the first mode of operation, the second mode of operation, and/or the third mode of operation.

In some embodiments, the first group mode of operation is more restrictive than the second group mode of operation. More restrictive control may include limiting operation of the prime mover 52 such that the first vehicle 10*a* (i) cannot exceed a first threshold speed that is less than a second threshold speed that the second vehicle 10*b* cannot exceed, (ii) is limited to rearward travel while the second vehicle 10*b* is not limited to rearward travel, and/or (iii) any other control to limit operation of the first vehicle 10*a* in a manner that is more restrictive than the operation of the second vehicle 10*b*. In some embodiments, when the location indicates that the first vehicle 10*a* and the second vehicle

10*b* are within a respective geofence 408, the fleet monitoring and control system 200 transitions the first group mode of operation to the second mode of operation and transitions the second group mode of operation to the second mode of operation such that the first group mode of operation is more restrictive than the second group mode of operation. By way of example, the fleet monitoring and control system 200 may control operation such that the first vehicle 10*a* cannot exceed the first threshold speed (e.g., 5 miles per hour) when the location indicates that the first vehicle 10*a* is within a respective geofence 408 (e.g., in the limited operation area 406) and may control operation such that the second vehicle 10*b* cannot exceed the second threshold speed (e.g., 10 miles per hour) greater than the first threshold speed when the location indicates that the second vehicle 10*b* is within the respective geofence 408 (e.g., in the limited operation area 406).

In some embodiments, when the location indicates that the first vehicle 10*a* and the second vehicle 10*b* are within a respective geofence 408, the fleet monitoring and control system 200 transitions the first group mode of operation to the second mode of operation and transitions the second group mode of operation to the second mode of operation such that the first group mode of operation imposes the same restrictions as the second group mode of operation. By way of example, the fleet monitoring and control system 200 may control operation such that the first vehicle 10*a* cannot exceed a first threshold speed (e.g., 5 miles per hour) when the location indicates that the first vehicle 10*a* is within the respective geofence 408 (e.g., in the limited operation area 406) and may control operation such that the second vehicle 10*b* cannot exceed a second threshold speed (e.g., 5 miles per hour) that is the same as the first threshold speed when the location indicates that the second vehicle 10*b* is within the respective geofence 408 (e.g., in the limited operation area 406). In such examples, the first vehicle 10*a* and the second vehicle 10*b* are configured to operate at or below the same threshold speed within the respective geofence 408.

In some embodiments, when the location indicates that the first vehicle 10*a* and the second vehicle 10*b* are outside of a respective geofence 408, the fleet monitoring and control system 200 transitions the first group mode of operation to the first mode of operation (or the third mode of operation) and transitions the second group mode of operation to the second mode of operation (or the third mode of operation) such that the first group mode of operation is less restrictive than the second group mode of operation. By way of example, the fleet monitoring and control system 200 may control operation such that the first vehicle 10*a* cannot exceed a third threshold speed (e.g., 15 miles per hour) when the location indicates that the first vehicle 10*a* is outside of the respective geofence 408 (e.g., in the drivable area 412) and may control operation such that the second vehicle 10*b* cannot exceed a fourth threshold speed (e.g., 10 miles per hour) less than the third threshold speed when the location indicates that the second vehicle 10*b* is outside of the respective geofence 408 (e.g., in the drivable area 412). In some embodiments, the third threshold speed is greater than the first threshold speed and the second threshold speed is greater than the fourth threshold speed such that such that, when the first vehicle 10*a* and the second vehicle 10*b* enter the geofence 408, the speeds thereof are limited. In some embodiments, the third threshold speed is the same as the fourth threshold speed such that the first vehicle 10*a* and the second vehicle 10*b* are configured to operate at or below the same threshold speed outside of the respective geofence 408. In some embodiments, the first group mode of operation is more restrictive than the second group mode of operation (e.g., depending on the type of vehicles or operators associated with the vehicles in each of the groups).

In some embodiments, if a threshold speed associated with the first group mode of operation or the second group mode of operation is less than a threshold speed associated with the respective geofence 408, the first vehicle 10*a* and the second vehicle 10*b* are limited to the threshold speed associated with the first group mode of operation or the second group mode of operation, respectively, when the first vehicle 10*a* and the second vehicle 10*b* are located either within or outside of the respective geofence 408 (e.g., regardless of the location of the first vehicle 10*a* or the second vehicle 10*b* relative to the respective geofence 408, the first vehicle 10*a* and the second vehicle 10*b* are limited to the threshold speed associated with the first group mode of operation or the second group mode of operation, respectively).

In some embodiments, when the first vehicle 10*a* and the second vehicle 10*b* are located within the outer geofence 408*a* and outside of the inner geofence 408*b*, the first group mode of operation and/or the second group mode of operation are less restrictive than the first group mode of operation and/or the second group mode of operation when the first vehicle 10*a* and the second vehicle 10*b* are located within the inner geofence 408*b*. By way of example, when the locations indicate that the first vehicle 10*a* and the second vehicle 10*b* are operating within the limited operation area 406 defined by the outer geofence 408*a*, the fleet monitoring and control system 200 may limit operation of the first vehicle 10*a* and the second vehicle 10*b* such that they cannot exceed a threshold speed. Further, in such an example, when the locations indicate that the first vehicle 10*a* and the second vehicle 10*b* are operating within a restricted operation area defined by the inner geofence 408*b*, the fleet monitoring and control system 200 may limit operation of the first vehicle 10*a* and/or the second vehicle 10*b* such that movement thereof is disabled or further limited (e.g., no power is transmitted to the prime mover 52, the braking system 70 stops the first vehicle 10*a* and the second vehicle 10*b*, a further reduced speed limit, etc.).

In some embodiments, the vehicles 10 are grouped in the first group 450 or the second group 454 based on (i) the type of the vehicles 10 (e.g., a golf cart, an ATV, a UTV, an LSV, a PTV, etc.) and/or (ii) the credentials of an operator of the vehicles 10 such that the operation of the vehicles 10 is permitted or limited depending on the type of the vehicles 10 and/or who are operating the vehicles 10. By way of example, a fleet of vehicles 10 at a school campus (e.g., vehicles 10 owned by the school, vehicles 10 operating around the school campus, etc.) may include shuttle buses, personal vehicles, emergency response vehicles, utility vehicles such as a refuse vehicle, a lawnmower, a scissor lift, a boom lift, a telehandler, a maintenance UTV, etc., among other vehicles. In such an example, the shuttle buses may be grouped in the first group 450 and the personal vehicles may be grouped in the second group 454 (e.g., further, the emergency response vehicles may be grouped in a third group, the utility vehicles may be grouped in a fourth group, etc.). By way of another example, a fleet of vehicles 10 including shuttle buses and PTVs operating within a community may be grouped such that the shuttle buses are grouped in the first group 450 and the PTVs are grouped in the second group 454. By way of yet another example, a fleet of vehicles 10 operating at a golf course may include golf carts grouped in the first group 450 and utility vehicles such as lawnmowers, turf mowers, push mowers, ride-on mowers, stand-on mowers, aerators, turf sprayers, bunker rakes, maintenance UTVs, etc. grouped in the second group 454. In such examples, the first vehicles 10*a* of a first type in the first group 450 may be limited to the first group mode of operation responsive to crossing into a respective geofence 408 and the second vehicles 10*b* of a second type in the second group 454 may be limited to the second group mode of operation responsive to crossing into the same respective geofence 408. In some embodiments, a larger, heavier vehicle (e.g., a vehicle 10 of a first type) grouped in the first group 450 is limited to the first group mode of operation and a smaller, lighter vehicle (e.g., a vehicle of a second type) grouped in the second group 454 is limited to the second group mode of operation that is less restrictive than the first group mode of operation (e.g., the first group mode of operation is more restrictive than the second group mode of operation) responsive to crossing the same respective geofence 408 (e.g., to inhibit larger and heavier vehicles 10 from operating at and navigating to areas with high pedestrian traffic, narrow spaces, residential areas, construction zones, etc.).

According to an exemplary embodiment, the first group mode of operation and the second group mode of operation are transitioned to the first mode of operation when the first group 450 and the second group 454 are operating in the drivable area 412 such that each of the first vehicles 10*a* in the first group 450 and the second vehicles 10*b* in the second group 454 are permitted to operate in an unrestricted manner in the drivable area 412. In embodiments where the first vehicles 10*a* and the second vehicles 10*b* are different types, the maximum threshold speed at which the first vehicles 10*a* and the second vehicles 10*b* can travel at while operating in an unrestricted manner may be different. By way of example, the first vehicles 10*a* may operate at a first maximum threshold speed less than a second maximum threshold speed at which the second vehicles 10*b* may operate such that the first vehicles 10*a* may drive slower (e.g., while operating in an unrestricted manner) compared to the second vehicles 10*b*.

In some embodiments, the first group mode of operation and/or the second group mode of operation are transitioned to the third mode of operation when the first group 450 and/or the second group 454 are operating in the drivable area 412 such that the first vehicles 10*a* in the first group 450 and/or the second vehicles 10*b* in the second group 454 are limited to a speed below a maximum threshold speed (e.g., below the first maximum threshold speed and the second maximum threshold speed, respectively) when the location indicates that they are outside of the limited operation area 406 (e.g., in the drivable area 412). By way of example, even if the vehicles 10 (e.g., first vehicles 10*a* in the first group 450 and the second vehicles 10*b* in the second group 454) are capable of traveling at a maximum threshold speed, the fleet monitoring and control system 200 may limit operation of the vehicles 10 to a speed below the maximum threshold speed when the location indicates that the vehicles 10 are outside of the limited operation area 406 (see, e.g., FIG. 5). In some embodiments, even if a speed limit associated with the first group mode of operation or the second group mode of operation is greater than the maximum threshold speed of the first vehicles 10*a* and the second vehicles 10*b*, respectively, when the first vehicles 10*a* and the second vehicles 10*b* are operating outside of the limited operation area 406, the fleet monitoring and control system 200 still limits the first vehicles 10*a* and the second vehicles 10*b* to the maximum threshold speed. In other words, the first vehicles 10*a* in the first group 450 and the second vehicles 10*b* in the second group 454 are inhibited from operating at a speed that is greater than the first maximum threshold speed and the second maximum threshold speed, respectively, thereof regardless of the speed limit associated with the first group mode of operation and the second group mode of operation.

In some embodiments, the vehicles 10 are grouped in the first group 450 or the second group 454 based on the credentials associated with the vehicles 10 and/or the credentials (e.g., a user profile) of the operators of the vehicles 10, thereby selectively restricting access to certain areas of the area 400 and/or limiting vehicle performance based on operator. By way of example, emergency vehicles may be grouped in the first group 450 and controlled in the first group mode of operation and other vehicles may be grouped in the second group 454 and controlled in the second group mode of operation that is more restrictive than the first group mode of operation responsive to crossing the same respective geofence 408. In such an example, the first group mode of operation may be transitioned to the first mode of operation (e.g., unrestricted operation) such that the emergency response vehicles (e.g., the first vehicles 10*a*) may operate in an unrestricted manner such that the emergency vehicle can respond and navigate to a location of an emergency located anywhere throughout the area 400. By way of another example, vehicles 10 driven by administrators at a school campus, driven by employees of a golf course, etc., may be grouped in the first group 450, and vehicles 10 (e.g., vehicles 10 with inferior credentials or no credentials) such as personal vehicles, golf carts driven by golfers, etc., may be grouped in the second group 454 such that operation of the second vehicles 10*b* is more restrictive than operation of the first vehicles 10*a*.

According to an exemplary embodiment, the user portal 230 is configured to facilitate operator implementation of configurations and/or parameters for the vehicles 10 and/or the area 400. By way of example, an operator may provide an input to the user portal 230 to establish the geofences 408 (e.g., the location of the geofences 408, the number of geofences 408, etc.). By way of another example, the operator may provide an input to the user portal 230 to set speed limits associated with a respective geofence 408, associated with the first group 450, and associated with the second group 454 (e.g., setting speed limits between about 0 miles per hour and about 25 miles per hour, setting speed limits in 0.1 mile per hour increments, etc.). By way of another example, the operator may provide an input to the user portal 230 to manually assign a respective vehicle 10 to the first group 450, the second group 454, or another group.

As utilized herein with respect to numerical ranges, the terms "approximately," "about," "substantially," and similar terms generally mean +/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The hardware and data processing components used to implement the various processes, operations, illustrative logics, logical blocks, modules, and circuits described in connection with the embodiments disclosed herein may be implemented or performed with a general purpose single-or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some embodiments, particular processes and methods may be performed by circuitry that is specific to a given function. The memory (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory may be or include volatile memory or non-volatile memory, and may include database components, object code components, script components, or any other type of information structure for supporting the various activities and information structures described in the present disclosure. According to an exemplary embodiment, the memory is communicably connected to the processor via a processing circuit and includes computer code for executing (e.g., by the processing circuit or the processor) the one or more processes described herein.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

It is important to note that the construction and arrangement of the vehicle 10 and the systems and components thereof (e.g., the body 20, the operator controls 40, the driveline 50, the suspension system 60, the braking system 70, the sensors 90, the vehicle control system 100, etc.) and the fleet monitoring and control system 200 (e.g., the remote systems 240, the user portal 230, the user sensors 220, etc.) as shown in the various exemplary embodiments is illustrative only. Additionally, any element disclosed in one embodiment may be incorporated or utilized with any other embodiment disclosed herein.

The invention claimed is:

1. A vehicle system for controlling operation of a plurality of vehicles, the vehicle system comprising:

one or more processing circuits configured to:

monitor locations of the plurality of vehicles relative to an area, the plurality of vehicles including a first vehicle associated with a first group of vehicles and a second vehicle associated with a second group of vehicles;

control operation of the first vehicle of the first group of vehicles in a first group mode of operation when the location indicates that the first vehicle is located in the area; and control operation of the second vehicle of the second group of vehicles in a second group mode of operation when the location indicates that the second vehicle is located in the area;

wherein the first group mode of operation is different than the second group mode of operation such that operation of a respective vehicle of the plurality of vehicles is controlled based on (i) whether the respective vehicle is associated with the first group of vehicles or the second group of vehicles and (ii) a location of the respective vehicle relative to the area.

2. The vehicle system of claim 1, wherein the one or more processing circuits are configured to limit operation of the first vehicle to the first group mode of operation when the location indicates that the first vehicle is located in the area, and limit operation of the second vehicle to the second group mode of operation when the location indicates that the second vehicle is located in the area.

3. The vehicle system of claim 2, wherein the first group mode of operation is more restrictive than the second group mode of operation.

4. The vehicle system of claim 2, wherein limiting operation of the first vehicle and the second vehicle includes at least one of (i) limiting operation of a prime mover of the first vehicle and a prime mover of the second vehicle, respectively, or (ii) limiting a direction of travel of the first vehicle or a direction of travel of the second vehicle, respectively.

5. The vehicle system of claim 1, wherein the respective vehicle is grouped in the first group of vehicles or the second group of vehicles based on a type of vehicle thereof.

6. The vehicle system of claim 5, wherein the first vehicle is a first type and the second vehicle is a second type that is smaller or lighter than the first type, and wherein the first group mode of operation is more restrictive than the second group mode of operation such that operation of larger or heavier vehicles is more restrictive than operation of lighter or smaller vehicles.

7. The vehicle system of claim 1, wherein the respective vehicle is grouped in the first group of vehicles or the second group of vehicles based on at least one of vehicle credentials associated with the respective vehicle or operator credentials of an operator associated with the respective vehicle.

8. The vehicle system of claim 1, wherein the area is defined by one or more geofences.

9. The vehicle system of claim 8, wherein the area includes a first area defined by a first geofence and a second area defined by a second geofence.

10. The vehicle system of claim 9, wherein, when the locations indicate that the first vehicle or the second vehicle is located in the first area, the first group mode of operation and the second group mode of operation are less restrictive than the first group mode of operation and the second group mode of operation when the locations indicate the first vehicle or the second vehicle is located in the second area.

11. The vehicle system of claim 9, wherein, when the locations indicate that the first vehicle or the second vehicle is located in the first area, the first group mode of operation and the second group mode of operation are more restrictive than the first group mode of operation and the second group mode of operation when the locations indicate the first vehicle or the second vehicle is located in the second area.

12. The vehicle system of claim 9, wherein the second geofence is positioned within the first geofence.

13. The vehicle system of claim 1, wherein the one or more processing circuits are configured to:

transition at least one of the first group mode of operation or the second group mode of operation to a first mode of operation to permit unrestricted operation of at least one of the first vehicle or the second vehicle when the locations indicate that the first vehicle and the second vehicle are located outside of the area; and transition at least one of the first group mode of operation or the second group mode of operation to a second mode of operation to limit operation of at least one of the first vehicle or the second vehicle when the locations indicate that the first vehicle and the second vehicle are located in the area.

14. The vehicle system of claim 13, wherein the one or more processing circuits are configured to (i) transition one of the first group mode of operation or the second group mode of operation to the first mode of operation and (ii) transition the other one of the first group mode of operation or the second group mode of operation to a third mode of operation that is more restrictive than the first mode of operation and less restrictive than the second mode of operation when the locations indicate that the first vehicle and the second vehicle are located outside of the area.

15. The vehicle system of claim 13, wherein, in the first mode of operation, the one or more processing circuits are configured to permit operation of the first vehicle and the second vehicle at or below a first maximum threshold speed and a second maximum threshold speed, respectively.

16. The vehicle system of claim 15, wherein, in the first mode of operation, the one or more processing circuits are configured to limit operation of the first vehicle and the second vehicle at or below the first maximum threshold speed and the second maximum threshold speed, respectively, even when a speed limit is greater than the first maximum threshold speed and the second maximum threshold speed.

17. The vehicle system of claim 1, wherein the first vehicle is one of a utility task vehicle, a low speed vehicle, a lightweight or recreational vehicle, a personal transport vehicle, a shuttle vehicle, a maintenance vehicle, a golf cart, or an all-terrain vehicle.

18. The vehicle system of claim 1, wherein the one or more processing circuits includes at least one of (i) a first processing circuit located on each of the plurality of vehicles or (ii) a second processing circuit located remote from the plurality of vehicles.

19. A vehicle system for controlling operation of a plurality of vehicles, the vehicle system comprising:

one or more processing circuits comprising one or more memory devices coupled to one or more processors, the one or more memory devices configured to store instructions thereon that, when executed by the one or more processors, cause the one or more processors to:

group each vehicle of the plurality of vehicles in a first group of vehicles or a second group of vehicles;

limit operation of a first vehicle of the plurality of vehicles grouped in the first group of vehicles in a first group mode of operation; and limit operation of a second vehicle of the plurality of vehicles grouped in the second group of vehicles in a second group mode of operation;

wherein the first group mode of operation is different than the second group mode of operation such that operation of a respective vehicle of the plurality of vehicles is controlled based on whether the respective vehicle is grouped in the first group of vehicles or the second group of vehicles, and wherein the respective vehicle is grouped in the first group of vehicles or the second group of vehicles based on at least one of (i) a type of vehicle thereof or (ii) at least one of vehicle credentials associated with the respective vehicle or operator credentials of an operator associated with the respective vehicle.

20. A vehicle system for controlling operation of a plurality of vehicles, the vehicle system comprising:

a non-transitory computer-readable medium having instructions stored thereon that, when executed by one or more processors, cause the one or more processors to:

monitor locations of the plurality of vehicles relative to an area, the plurality of vehicles including a first vehicle associated with a first group of vehicles and a second vehicle associated with a second group of vehicles;

control operation of the first vehicle of the first group of vehicles in a first group mode of operation when the location indicates that the first vehicle is located in the area; and control operation of the second vehicle of the second group of vehicles in a second group mode of operation when the location indicates that the second vehicle is located in the area;

wherein the first group mode of operation is different than the second group mode of operation such that operation of a respective vehicle of the plurality of vehicles is controlled based on (i) whether the respective vehicle is associated with the first group of vehicles or the second group of vehicles and (ii) a location of the respective vehicle relative to the area.

* * * * *